Patented July 14, 1931

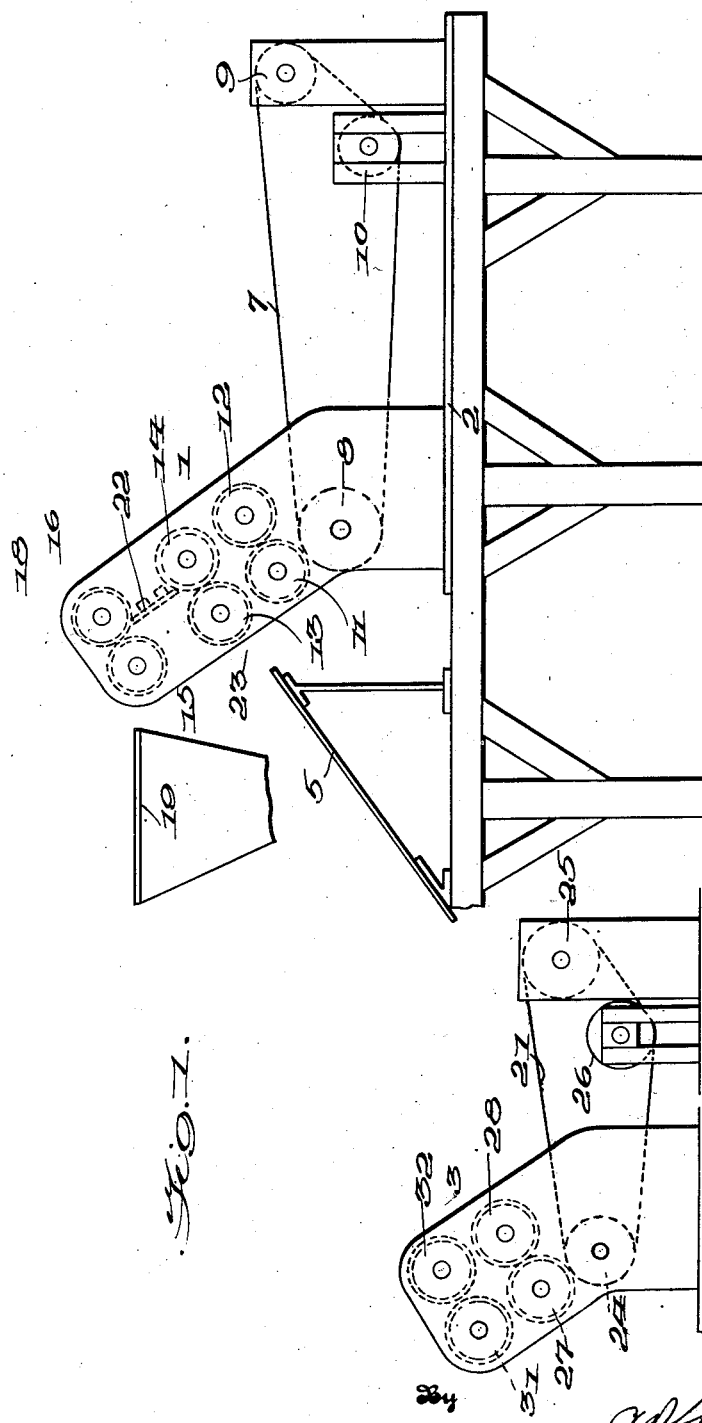

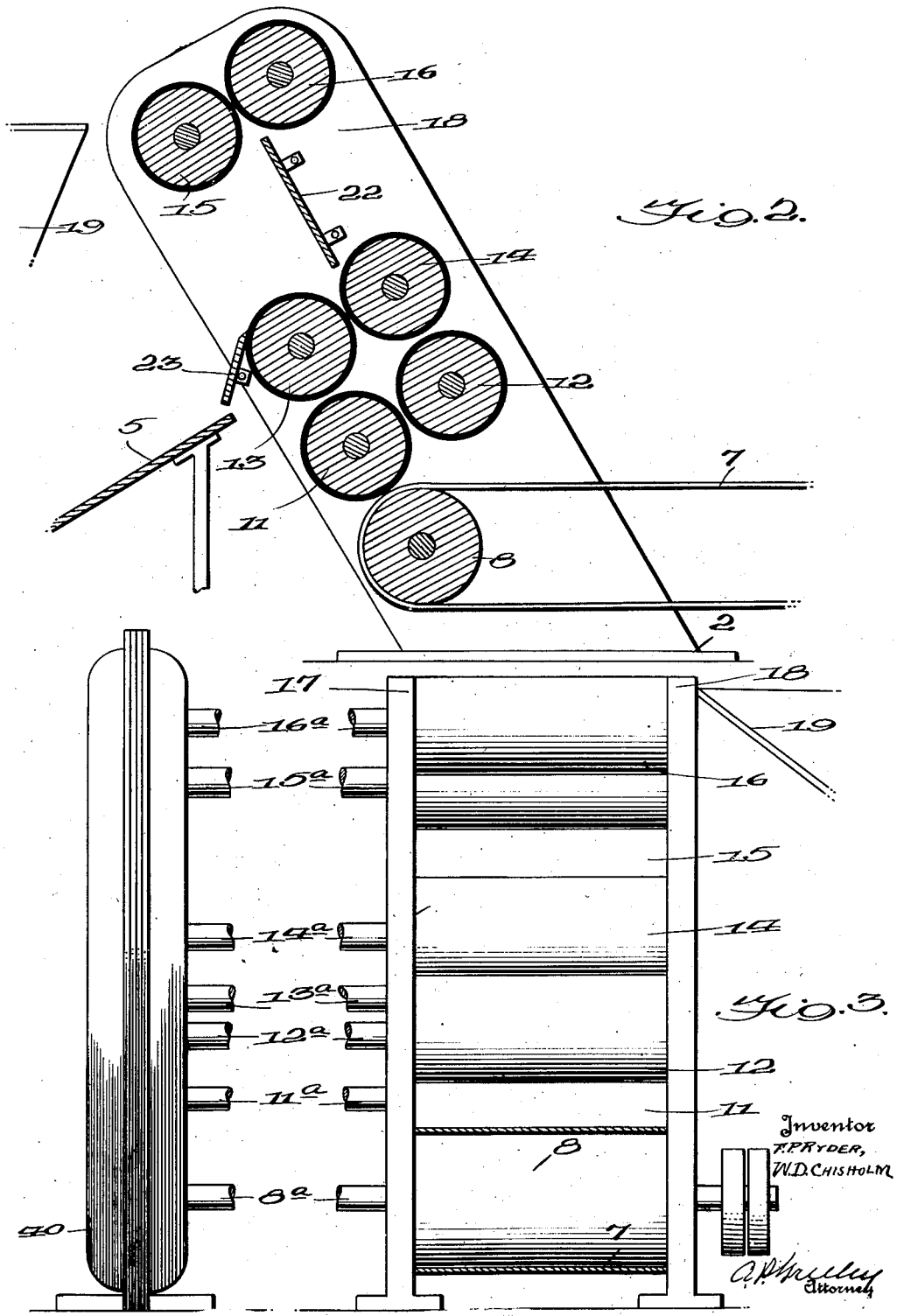

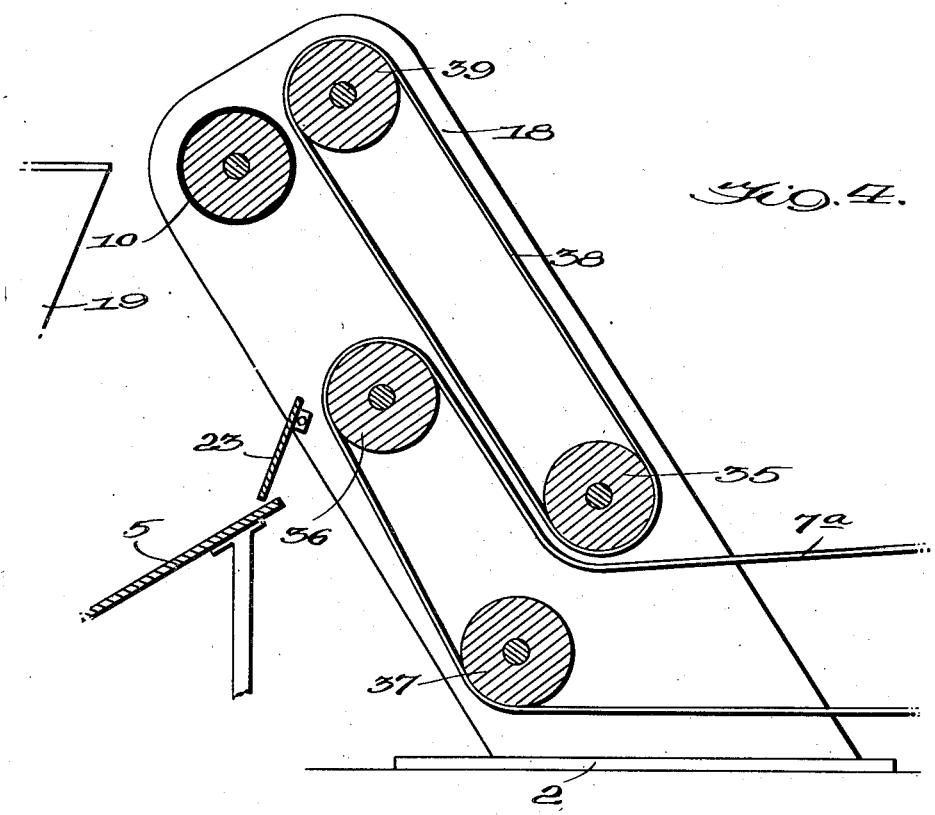

1,814,633

UNITED STATES PATENT OFFICE

FRANK PITTIS RYDER AND WILLIAM DONALD CHISHOLM, OF NIAGARA FALLS, NEW YORK

METHOD AND APPARATUS FOR SEPARATING STRING BEANS

Application filed October 1, 1929. Serial No. 396,568.

Our invention relates to means for separating string beans from stalks and other portions of the plants on which they were grown. The canning of string beans has become an extensive industry and hardly less important than the canning of green peas. But while it has been found possible to do away with the hand labor formerly required for picking and shelling green peas by viners which thresh the peas from the vines, the harvesting of string beans presents much greater difficulty and up to the present time it is the general practice to hand pick the beans from the vines. It is possible to strip the beans from the plants on which they were grown by mechanical means but in so stripping the beans from the plants, stalks and leaves are stripped with them and the separation of the beans from these stalks and leaves is difficult. Beans picked by hand also carry with them more or less leaves and pieces of stalk which it is desirable to eliminate. It is the object of our present invention to devise means for effecting this separation.

While string beans are of considerable length and substantial thickness, some of the stalks stripped from the plants with the beans may be longer than the beans and of as great thickness and may be equally heavy with sap. Leaves, leaf stalks and many of the plant stalks will be of less thickness than the beans, the thickness of the beans suitable for canning being about ten sixty-fourths of an inch.

In carrying out our invention we first separate out the stalks of greater length than the beans by causing them to bridge a space through which the beans, being of less length than this space, will fall together with the leaves and shorter stalks, and then separate the beans from these shorter and thinner stalks and leaves by imparting to the beans a velocity of movement which causes them to be impelled or thrown to a distance greater than that to which the thinner stalks and leaves will be thrown.

The method and apparatus of our present invention is devised to carry out the separation of string beans from stalks and other portions of the plants on which they are grown by first eliminating the stalks of greater length than the beans and subsequently eliminating the thinner stalks and leaves and our present application is particularly directed to the method and apparatus for the preliminary elimination of the longer stalks.

With the objects above indicated and other objects hereinafter explained in view our invention consists in the method and apparatus hereinafter described and claimed.

Referring to the drawings:

Figure 1 is a longitudinal sectional view of a complete apparatus embodying our invention and adapted to carry out our method.

Figure 2 is a longitudinal, sectional view of the first or stalk eliminating unit.

Figure 3 is an end view of the same, and

Figure 4 is a view similar to Figure 2 but showing a modified form of feeding means.

In the drawings 1 indicates the first or stalk eliminating unit, arranged on a base 2, and 3 indicates the second or accelerating unit arranged on base 4. Base 2 if preferably arranged on a plane so far above base 4 that the beans, shorter stalks and leaves which drop from unit 1 may be led by chute 5 to the feed belt of the second unit.

Unit 1 comprises a feed belt 7 carried by rollers 8, 9, and 10, of which roller 8 may be driven and roller 10 is carried in adjustable bearings to serve as a tightening and aligning means to keep the feed belt from sagging and to keep it from side movement. Above and forward of roller 8 is a roller 11 which with the roller 12 forms a pair of gripping rollers adapted to grip and feed forward and upward the beans with the portions of the plants mingled with them supplied by the feed belt. Above and forward of the pair of rollers 11, 12, is a second pair of feeding or aligning rollers 13, 14, arranged to receive between them the beans and portions of the plants from rollers 11, 12. The pairs of rollers 11, 12 and 13, 14, are sufficiently near together to cause the beans and stalks passing between them to be fed in a straight line and their shafts are so mounted in the housings that the line of feed will be at an angle of about 45 degrees to the vertical. Forward of and above the pair of rollers 13, 14, is a pair of gripping rollers 15, 16, in line with the rollers 11, 12 and 13, 14, but separated from rollers 12 and 13 by a space equal to the length of the longest of the beans. The rollers of each of the pairs of rollers 11, 12; 13, 14; and 15, 16, have their peripheral surfaces covered with yielding material such as rubber so that the beans fed between them will not be bruised or otherwise injured. The peripheries of the rollers of each pair are in contact.

Rollers 11, 12 are preferably driven at a peripheral speed of about 50 feet per minute. Rollers 13, 14 are driven at a higher speed, preferably about 100 feet per minute, to straighten beans and stalks into line with the line of feed. Rollers 15, 16 are driven at a still higher rate of speed, preferably about 150 feet per minute to grip the stalks. Stalks longer than the beans will by rollers 13, 14, be caused to bridge the space between these rollers and rollers 15, 16, so that their forward ends will enter between the peripheries of the latter and be gripped and fed forward to fall into a chute 19 or other receiving means by which they may be led away preferably to one side. Beans, leaves and shorter stalks fall through the space between rollers 13 and 15 preferably onto an incline 5 to slide down onto feed belt 21 of the second unit. A shield 22 is preferably arranged to extend between the peripheries of rollers 14 and 16 above the line of feed and a shield 23 may be arranged with its upper end near the upper portion of the periphery of roller 13 to guide the beans, stalks and other portions of the plants falling through the space between rollers 13 and 15 to the incline 5.

The second unit comprises the feed belt 21 carried by rollers 24, 25, and 26, of which roller 24 may be driven and roller 26 is a tightener and aligning roller similar to roller 10 of the first unit. Slightly above and forward of roller 24 is roller 27 which with roller 28 forms a pair of gripping rollers adapted to grip and feed forward the beans, shorter stalks and leaves from the feed belt 21 and to feed them forward and upward to a pair of accelerating rollers 31 and 32. The line of feed is preferably at an angle of about 45 degrees to the vertical but may be horizontal. Rollers 27, 28, are each provided with a peripheral covering of yielding material such as rubber so as not to injure beans fed forward by them, and their peripheral surfaces approximately in contact. Rollers 27, 28, are preferably driven at a peripheral speed of 50 feet per minute.

The accelerating rollers are forward, and preferably above the gripping rollers 27, 28, and are driven at a peripheral speed much greater than the peripheral speed of the gripping rollers, preferably at a peripheral speed of 150 feet per minute. Their peripheral surfaces are covered with yielding material such as rubber and are so spaced that their peripheries are separated by a distance equal to the thickness of the smallest of the beans which are desirable for canning. The yielding surfaces of these rollers permit beans of greater thickness to pass between them without injury. All beans which reach these accelerator rollers and are of a thickness greater than the space between the peripheries of their rollers will be sized and will have imparted to them a velocity of travel equal to the peripheral speed of the rollers, while stalks, leaves and other portions of the bushes of less thickness will contact only with the peripheral surface of the lower roller by gravity alone and their velocity of travel will be only slightly increased over the periperal speed of the gripping rollers. Beans and stalks accelerated by rollers 31, 32, are caused to jump a considerable distance from the point at which they leave the rollers, while thinner portions of the bushes, not being substantially accelerated will drop nearer, practically close to unit 3. Their movement may, if desired, be checked by a downwardly directed air current.

Instead of the pairs of rollers 11, 12, and 13, 14, the upper side of the feed belt 7a may extend as shown in Figure 4 forward beneath a roller 35 corresponding in position with roller 12 of Figures 1 and 2, and then upward over roller 36 corresponding in position to roller 13 of Figures 1 and 2, and then downward about a roller 37 corresponding in position to roller 8 of Figures 1 and 2, and back to tightener roller 10 and an endless belt 38 is carried on roller 35 and roller 39 corresponding in position to roller 16 of Figures 1 and 2. Roller 40 corresponds in position to roller 15 of Figures 1 and 2, its periphery being in contact with belt 38. Shield 23 may be used in this modified construction but shield 22 may be dispensed with.

Any driving means adapted to drive the rollers of units 1 and 3 at the speeds above indicated may be used. In Figure 3 an arrangement of driving means is indicated. In this arrangement the driven shaft 8a extends into gear box 40 to drive through suitable gearing and preferably through flexible connections, shafts, 11a, 12a, 13a, 14a, 15a, and 16a, of the several rollers 11, 12, 13, 14, 15, and 16.

We do not herein claim the specific arrangement shown in unit 2 or the arrangement in which unit 2 is caused to act upon the beans, stalks, and other portions of the plants in advance of unit 1 as such specific construction and arrangement form the subject matter of a separate application for patent filed by us of even date herewith.

Having thus described our invention what we claim is:

1. The method of separating string beans from stalks of greater length than the beans which comprises so imparting movement of translation to the beans and stalks in a straight line that the stalks of greater length will be caused to bridge an opening of less length than such stalks but of greater length than the beans and continuing the further movement of the stalks while permitting the beans to drop.

2. The method of separating string beans from stalks of greater length than the beans which comprises so imparting movement of translation in a straight line to the beans and stalks that they will be in line with the direction of movement, continuing the movement so that stalks of greater length will be caused to bridge an opening of less length than such stalks but of greater length than the beans and continuing the further movement of the stalks while permitting the beans to drop.

3. The method of separating string beans from stalks of greater length than the beans which comprises so imparting movement of translation to the beans and stalks in a straight line inclined from the vertical that the stalks of greater length will be caused to bridge an opening of less length than such stalks but of greater length than the beans and continuing the further movement of the stalks while permitting the beans to drop.

4. The method of separating string beans from stalks of greater length than the beans which comprises so imparting movement of translation to the beans and stalks in a straight line inclined from the vertical that they will be in line with the direction of movement, continuing the movement so that the stalks of greater length will be caused to bridge an opening of less length than such stalks but of greater length than the beans and continuing the further movement of the stalks while permitting the beans to drop.

5. The method of separating string beans from stalks of greater length than the beans and other portions of the plants on which they were grown which consists in separating the stalks by so imparting movement of translation to the beans and stalks and other portions of the plants in a straight line that the stalks of greater length will be caused to bridge an opening of less length than such stalks but of greater length than the beans and continuing the further movement of the stalks while permitting the beans and other stalks to drop, and subsequently separating the beans from the other stalks and portions of the plants.

6. The method of separating string beans from portions of the plants on which they were grown such as loose leaves and stalks which comprises eliminating stalks of greater length than the beans by so imparting movement of translation to the beans, stalks and other portions of the plants that the stalks of greater length than the beans will be caused to bridge an opening of less length than such stalks but of greater length than the beans and continuing the further movement of such stalks while permitting the beans, loose leaves and shorter stalks to drop, and subsequently separating the beans from the loose leaves and stalks carried with them by so imparting to the beans, leaves and stalks movement of translation that the beans will be given a movement of translation of greater velocity than that given to such leaves and stalks as to cause the beans to be impelled further than the leaves and stalks are impelled.

7. The method of separating string beans from portions of the plants on which they were grown such as loose leaves and stalks which comprises eliminating stalks of greater length than the beans by so imparting movement of translation to the beans, stalks and other portions of the plants that the stalks of greater length than the beans will be caused to bridge an opening of less length than such stalks but of greater length than the beans and continuing further movement of such stalks while permitting the beans, loose leaves and shorter stalks to drop, and subsequently separating the beans from the loose leaves and stalks carried with them by so imparting to the beans, leaves and stalks movement of translation in a line oblique to the vertical that the beans will be given a movement of translation of greater velocity than that given to such leaves and stalks as to cause the beans to be impelled further than the leaves and stalks are impelled.

8. Means for separating string beans from stalks of greater length than the beans comprising a first impelling means and a second impelling means spaced away from the first impelling means, the first impelling means being adapted to so impart movement of translation to the beans and stalks in a straight line that the stalks of greater length will be caused to bridge the space between said impelling means and the second impelling means, said space being of less length than such stalks but of greater length than the beans.

9. Means for separating string beans from stalks of greater length than the beans comprising a first impelling means and a second impelling means spaced away from the first impelling means, the first impelling means being adapted to so impart movement of translation to the beans and stalks in a straight line oblique to a vertical line that the stalks of greater length will be caused to bridge the space between said impelling means and the second impelling means, said space being of less length than such stalks but of greater length than the beans.

10. Means for separating string beans from stalks of greater length than the beans comprising a first impelling means including a pair of feed rollers and a second impelling means comprising a pair of feed rollers spaced away from the first impelling means, the first impelling means being adapted to so impart movement of translation to the beans and stalks in a straight line that the stalks of greater length will be caused to bridge the space between said impelling means and the second impelling means, said space being of less length than such stalks but of greater length than the beans.

11. Means for separating string beans from stalks of greater length than the beans comprising a first impelling means, including a pair of gripping rollers and a second pair of rollers, and a second impelling means spaced away from the first impelling means, the first impelling means being adapted to bring the beans and stalks into line with the line of feed and to so impart movement of translation to the beans and stalks in a straight line that the stalks of greater length will be caused to bridge the space between said impelling means and the second impelling means, said space being of less length than such stalks but of greater length than the beans.

12. Means for separating string beans from stalks of greater length than the beans comprising a first impelling means, including a pair of gripping rollers and a second pair of rollers and a second impelling means spaced away from the first impelling means, the first impelling means being adapted to bring the beans and stalks into line with the line of feed and to so impart movement of translation to the beans and stalks in a straight line oblique to a vertical line that the stalks of greater length will be caused to bridge the space between said impelling means and the second impelling means, said space being of less length than such stalks but of greater length than the beans.

13. Means for separating string beans from stalks of greater length than the beans comprising a first impelling means, and a second impelling means spaced away from the first impelling means, the first impelling means being adapted to bring the beans and stalks in line with the line of feed and to so impart movement of translation to the beans and stalks in a straight line oblique to a vertical line that the stalks of greater length will be caused to bridge the space between said first impelling means and the second impelling means, said space being of less length than such stalks but of greater length than the beans, and a shield between the first and second impelling means above the line of feed.

14. Means for separating string beans from stalks of greater length than the beans comprising a first impelling means including a pair of gripping rollers driven at a predetermined peripheral speed and a second pair of rollers driven at a higher peripheral speed, and a second impelling means spaced away from the first impelling means, the first impelling means being adapted to bring the beans and stalks in line with the line of feed and to so impart movement of translation to the beans and stalks in a straight line that the stalks of greater length will be caused to bridge the space between said impelling means and the second impelling means, said space being of less length than such stalks but of greater length than the beans.

15 Means for separating string beans from stalks of greater length than the beans comprising a first impelling means including a pair of gripping rollers driven at a predetermined peripheral speed and a second pair of rollers driven at a higher peripheral speed, and a second impelling means spaced away from the first impelling means, the first impelling means being adapted to bring the beans and stalks in line with the line of feed and to so impart movement of translation to the beans and stalks in a straight line oblique to a vertical line that the stalks of greater length will be caused to bridge the space between said impelling means and the second impelling means, said space being of less length than such stalks but of greater length than the beans.

In testimony whereof, we hereunto affix our signatures.

FRANK PITTIS RYDER.
WILLIAM DONALD CHISHOLM.